(12) United States Patent
Ma et al.

(10) Patent No.: US 10,664,475 B2
(45) Date of Patent: May 26, 2020

(54) GENERATING A NATIVE ACCESS PLAN FOR SEMI JOIN OPERATORS

(71) Applicant: Sybase, Inc., Dublin, CA (US)

(72) Inventors: Xiaobin Ma, Dublin, CA (US); Xun Cheng, Dublin, CA (US)

(73) Assignee: SYBASE, INC., Dublin, CA (US)

( * ) Notice: Subject to any disclaimer, the term of this patent is extended or adjusted under 35 U.S.C. 154(b) by 729 days.

(21) Appl. No.: 14/974,820

(22) Filed: Dec. 18, 2015

(65) Prior Publication Data

US 2017/0177666 A1    Jun. 22, 2017

(51) Int. Cl.
*G06F 7/00* (2006.01)
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC .................................................. G06F 16/2456
USPC ......................................................... 707/714
See application file for complete search history.

(56) References Cited

U.S. PATENT DOCUMENTS

| | | | |
|---|---|---|---|
| 2005/0222965 A1* | 10/2005 | Chaudhuri | G06F 17/30306 |
| 2007/0061288 A1* | 3/2007 | Fuh | G06F 16/24544 |
| 2009/0254774 A1* | 10/2009 | Chamdani | G06F 9/4881 714/2 |
| 2012/0023092 A1* | 1/2012 | Egan | G06F 16/24542 707/718 |
| 2012/0079004 A1* | 3/2012 | Herman | H04L 67/26 709/203 |
| 2012/0089610 A1* | 4/2012 | Agrawal | G06Q 10/00 707/741 |
| 2012/0143817 A1* | 6/2012 | Prabaker | G06F 21/6218 707/608 |
| 2012/0310921 A1* | 12/2012 | Egan | G06F 16/284 707/718 |
| 2014/0280280 A1* | 9/2014 | Singh | G06F 16/24545 707/759 |
| 2016/0012083 A1* | 1/2016 | Mottupalli | G06F 16/2386 707/634 |
| 2017/0060539 A1* | 3/2017 | Ma | G06F 16/951 |
| 2017/0060948 A1* | 3/2017 | Ma | G06F 16/2246 |
| 2017/0177664 A1* | 6/2017 | Ma | G06F 16/24542 |

* cited by examiner

*Primary Examiner* — Eliyah S. Harper
(74) *Attorney, Agent, or Firm* — Sterne, Kessler, Goldstein & Fox P.L.L.C.

(57) ABSTRACT

Disclosed herein are system, method, and computer program product embodiments for generating a native access plan for semi join operators. An embodiment operates by generating a plurality of variables based upon the positions of a plurality of operators in a compiled query plan, opening and traversing tables as the query plan is executed, and closing those tables based on the rows queried and the plurality of variables.

20 Claims, 6 Drawing Sheets

400

402

```
For (operator 4)   ～ 404
  {
    For (operator 8)   ～ 406
      {
        For (operator 9)   ～ 408
          {
            For (operator 7)   ～ 410
              {
                operator 2   ～ 412
              }
          }
      }
  }
```

FIG. 4

GENERATING A NATIVE ACCESS PLAN FOR SEMI JOIN OPERATORS

BACKGROUND

Generally, when a semi join operator is executed in a query plan, the right side operators of the semi joined are closed once a qualified row for the semi join operator is found. In a model where the query plan is a tree of operators, it is relatively straightforward for the system to distinguish which operators are the right side operators of a semi join operator in order to close them. However, if the query plan is generated into a native access plan and further compiled into an intermediate representation language (such as that used by a Low-Level Virtual Machine (LLVM)) or native binary code, the system may not be able to determine which operators are the right side operators of a semi join operator. Thus, when the query plan is in an intermediate representation language, the system may not be able to close the right side operators when a qualified row is found.

BRIEF DESCRIPTION OF THE DRAWINGS

FIG. 4 is a diagram illustrating an example of the structure of a native access plan generated from the query plan, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for generating an intermediate representation code for semi join operators.

Figure 1:
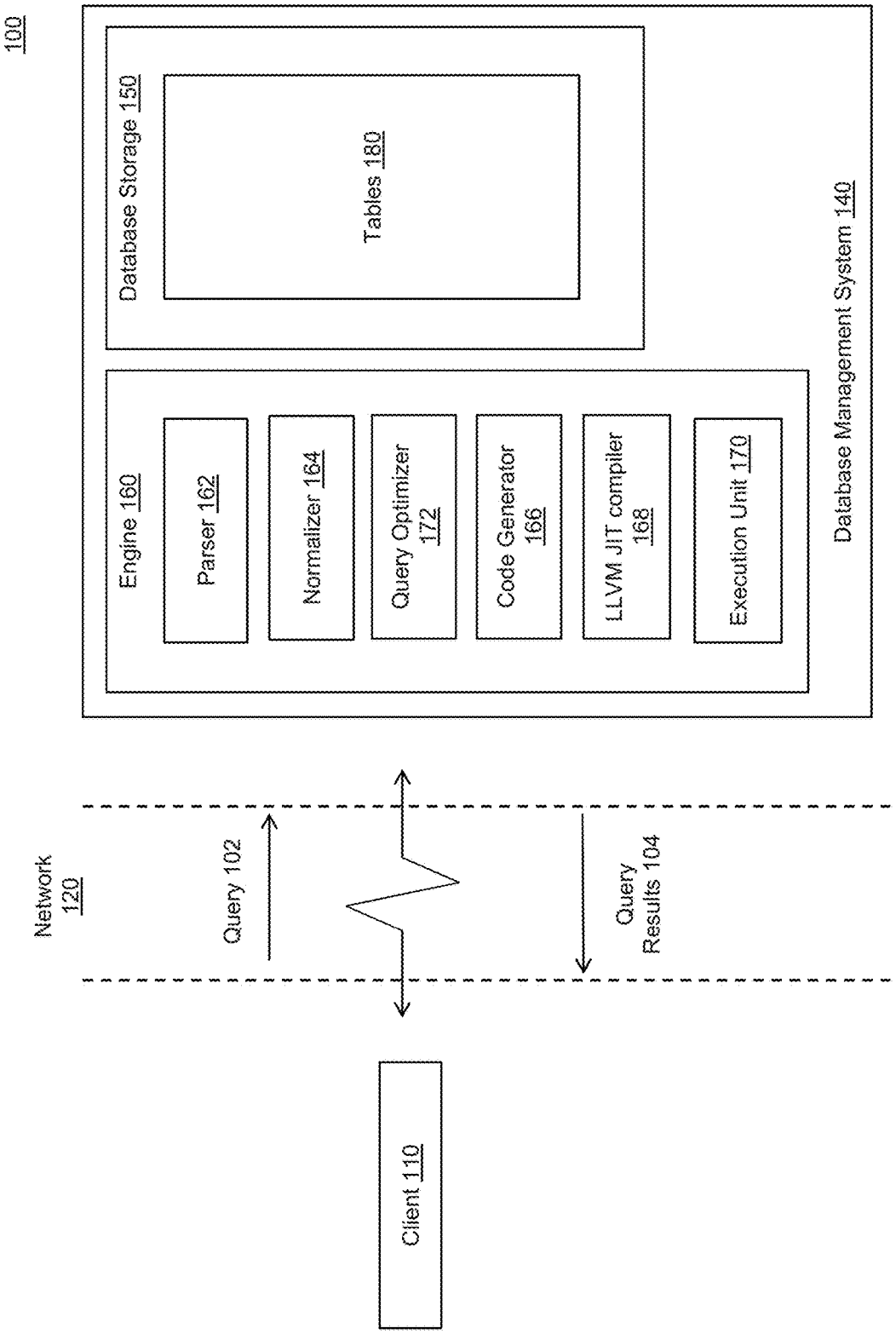
FIG. 1 is a block diagram of a database system for generating a native access plan for semi join operators, according to an example embodiment.

FIG. 1 is a block diagram of a database system 100 for generating a native access plan for semi join operators, according to an example embodiment. Database system 100 includes a database management system (DBMS) 140 and client 110 that communicates with DBMS 140. DBMS 140 can be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. Client 110 can request access to DBMS 140. Additionally, both client 110 and DBMS 140 can execute within a computer system, such as an example computer system discussed in FIG. 6.

Client 110 and DBMS 140 can communicate over network 120. Network 120 can be any wired and/or wireless network or combination of wired and/or wireless networks that can carry data communications. Such a network 120 can include, but is not limited to, a wired and/or wireless local area network, metropolitan area network, and/or wide area network that includes the Internet.

A relational database is a collection of data items organized as a set of formally-described tables from which data can be accessed or reassembled in many different ways without having to reorganize the database tables. A relational database employs a set of tables containing data fitted into predefined categories.

In an embodiment, the rows and/or columns are stored in one or more of tables 180. Any combination of the rows and/or columns of tables 180 can be stored compressed or uncompressed in tables 180. That data in tables 180 can be compressed using row compression, page-dictionary compression, page-index compression, column compression, or any combination thereof. Compressed rows and/or columns of tables 180 can each be compressed with different compression types. The rows and/or columns of table 180 can be stored in memory.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but can be another query language, such as SQL Script (a scripting language for describing application specific calculations inside the database), a MultiDimensional eXpressions (MDX), WIPE (weakly structure information processing and exploration) for data graph processing and FOX (for planning applications), to give a few examples. DBMS 140 is able to interpret query 102 in accordance with the query language and, based on the interpretation, generate requests to database storage 150.

Query 102 can be generated by a user using client 110 or by an application executing on client 110. Upon receipt, DBMS 140 begins to process query 102. Once processed, the result of the processed query is transmitted to client 110 as query result 104.

In an embodiment, query 102 includes one or more sub-queries. A sub-query is a query included within another query. Any sub-query may comprise one or more sub-queries.

In an embodiment, to process query 102, DBMS 140 may include engine 160, which may include a parser 162, a normalizer 164, a code generator 166, a Low-Level Virtual Machine (LLVM) Just-in-Time (JIT) compiler 168, an execution unit 170, a query optimizer 172, or any combination thereof.

Parser 162 parses the received queries 102. In an embodiment, parser 162 converts query 102 into a binary tree data structure which represents the format of query 102. In other embodiments, other types of data structures are used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to query optimizer 172. Query optimizer 172 analyzes the query and determines a query plan for executing the query. The query plan retrieves and manipulates information in the database storage 150 in accordance with the query semantics. This can include choosing the access method for each table accessed, choosing the order in which to perform a join operation on the tables, and choosing the join method to be used in each join operation. As there can be multiple strategies for executing a given query using combinations of these operations, query optimizer 172 generates and evaluates a number of strategies from which to select the best strategy to execute the query.

In an embodiment, query optimizer 172 generates multiple query plans. Once generated, query optimizer 172 selects a query plan from the multiple query plans to execute the query. The selected query plan may be a cost efficient plan, a query plan that uses the least amount of memory in DBMS 140, a query plan that executes the quickest, or any combination of the above, to give a few examples. In an embodiment, the selected query plan may be the query plan that invokes the least Input/Output accesses, which may be executed the fastest, particularly when the Input/Output accesses involve compression and decompression operations.

After processing the query plan, query optimizer 172 forwards the processed query plan to code generator 166. Code generator 166 compiles the processed query plan into source code of a native access plan. The compilation process determines how query 102 is executed by DBMS 140. LLVM JIT compiler unit 168 converts the source code of the native access plan generated by code generator 166 into intermediate representation code and native executable binary code. Execution unit 170 receives the native executable binary code and executes it to produce query results 104.

In an embodiment, LLVM JIT compiler unit 168 converts the source code of the native access plan generated by code generator 166 into intermediate representation code and native executable binary code. Intermediate representation code can be used to generate object or machine code in a machine-readable format for a target machine. Intermediate representation code can be run using an interpreter or compiled using a compiler, such as a JIT compiler, into native code. In an embodiment, LLVM JIT compiler 168 converts the native access plan into a Low-Level Virtual Machine (LLVM) intermediate representation. For example, LLVM JIT compiler 168 can generate intermediate representation code in accordance with the method depicted in FIG. 2.

Figure 2:
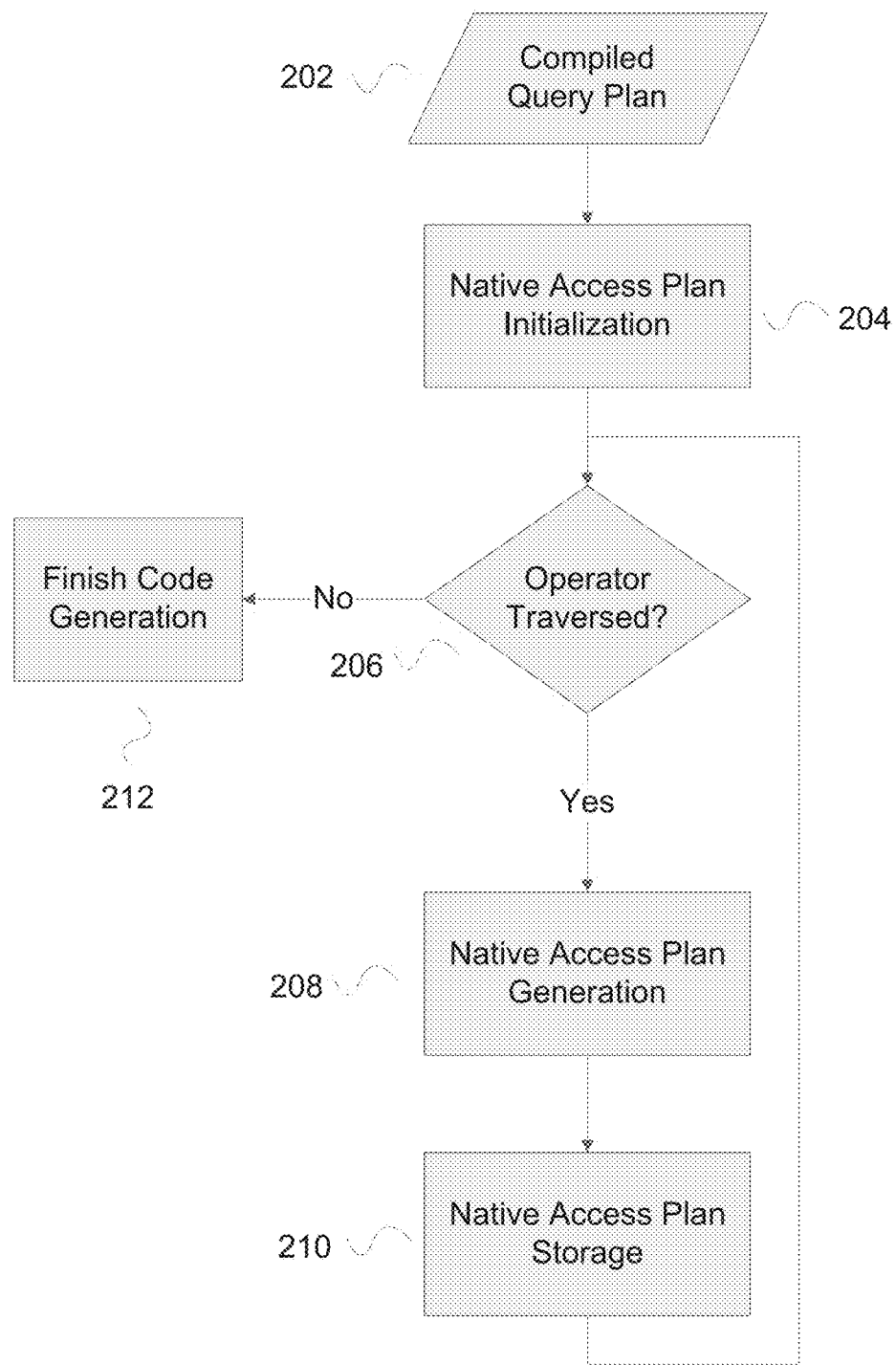
FIG. 2 is a flowchart illustrating a process for generating a native access plan, according to an example embodiment.

FIG. 2 is a flowchart for a method 200 for generating a native access plan, according to an embodiment. Method 200 can be performed by processing logic that can comprise hardware (e.g., circuitry, dedicated logic, programmable logic, microcode, etc.), software (e.g., instructions executing on a processing device), or a combination thereof.

At block 202, code generator 166 receives a query plan. In an embodiment, the received query plan comprises trees built of operators. Each operator may implement the same application program interfaces (APIs)—for example, Acquire, Open, Next, Close and Release, to name a few. Further, the query plan may be a consumer-driven model—i.e. the query plan is driven by its top-most operator.

At block 204, code generator 166 performs initializations to prepare for native access plan generation. According to an embodiment, these initializations may comprise generating an native access plan module for a compiled native access plan, generating a function signature for a compiled native access plan, generating blocks for a native access plan, generating structure types and constants used by code generator 166, retrieving and storing variables, and/or any combination thereof.

At block 206, code generator 166 traverses operators in the trees of the query plan and determines whether all operators in the query plan have been traversed. If all the operators of the query plan have been traversed then the system moves to block 212 and the code generation is finished. Else, code generator 166 may generate the source code of the native access plan for the operators of the query plan as detailed at block 208. In an embodiment, block 206 determines whether all of the operators of the query plan have been traversed and/or processed.

In an embodiment, code generator 166 traverses the trees of the query plan from a root node and generates the native access plan based upon the traversal.

At block 208, code generator 166 generates the native access plan based upon the operators of the query plan. In an embodiment, code generator 166 generates the source code of the native access plan in a bottom-up post order. For example, when code generator 166 traverses a Nested Loop Join (NLJ) in the query execution plan, code generator 166 first generates source code of the native access plan for the left child of the NLJ, then the right child of the NLJ, and then the parent of the NLJ. In this example, the source code of the native access plan is first produced for the child operators before generating the source code of the native access plan for the parent operator. The native access plan for the parent operator may be generated by calling or consuming the source code of the native access plan of the child operators. Code generator 166 may repeat this bottom-up post order of source code of the native access plan until all operators of the query plan have been traversed.

According to an embodiment, when an operator of the query plan is traversed, code generator 166 can generate source code of the native access plan based upon the operator traversed according to a member function. For example, for each operator in the query plan, there may be a set of functions that generates source code of the native access plan based on the functionalities of the operator according to a member function. This set of functions and member function may be stored in a class.

At block 210, after code generator 166 has generated source code of the native access plan for an operator, the source code of the native access plan may be placed in blocks generated during initialization, according to an embodiment. In an embodiment, these blocks are placed in vectors.

In an embodiment, after the source code of the native access plan has been generated for a child operator, the source code of the native access plan is placed in a temporary storage. When generating source code of the native access plan for the child's parent operator, the source code of the native access plan from the child operator is recalled and stored in a block generated during initialization.

According to an embodiment, once source code of the native access plan has been generated for a parent operator, the source code of the native access plan generated from the parent's child operator may be removed from temporary storage.

In an embodiment, after code generator 166 has finished generating source code of the native access plan for some or all parent operators, blocks comprising source code of the native access plan generated from a parent's child operator may be removed from a vector containing a block comprising source code of the native access plan generated from the parent operator.

Figure 3:
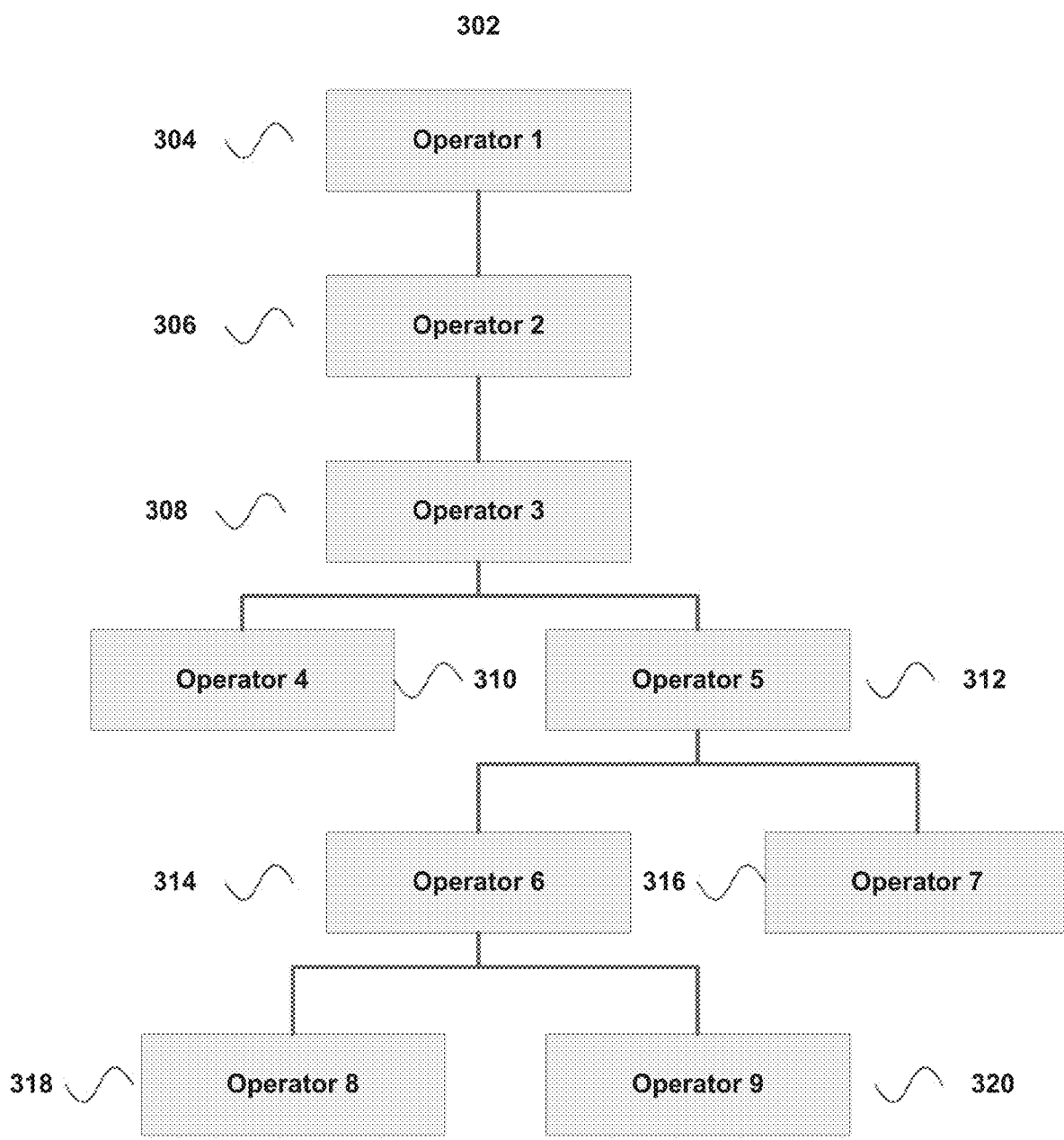
FIG. 3 is a diagram illustrating an example of a query plan, according to an example embodiment.

FIG. 3 is an example of a query plan 300, according to an embodiment. The query plan may comprise a tree 302 of built of operators 1, 2, 3, 4, 5, 6, 7, 8, and 9 (304, 306, 308, 310, 312, 314, 316, 318, and 320 respectively) with operators 3, 5, and 6 (308, 312, and 314, respectively) being semi join operators. Each of the operators may implement the same or different application program interfaces (APIs)—for example, Acquire, Open, Next, Close and Release, to name a few.

According to an embodiment, the operators may each comprise a virtual address variable based upon the operator's position in the tree of the query plan. The operators may have a virtual address variable comprising a value equal to the operator's position in the tree, such as a value of 1 for operator 1 304 as it located at the top of the tree or a value of 2 for operator 2 306, in a non-limiting example.

Query plan 300 illustrates an example relationship between the operators within the tree. For example, operator 4 310 is the left child operator of semi join operator 3 308, and semi join operator 5 312 is the right child operator semi join operator 3 308. As another example, operator 8 318 is the left child operator of semi join operator 6 314 and operator 9 320 is the right child of semi join operator 6 314. Further, semi join operator 6 314 is the left child of semi join operator 5 312.

FIG. 4 is an example of the structure 400 of a native access plan 402 generated from the query plan, according to an embodiment. The structure of intermediate representation code comprises logic loops and operators 2, 4, 7, 8, and 9 (412, 404, 410, 406, and 408 respectively). The structure 400 of the native access plan 402 retains the same relationships between the operators as query plan 300. In an embodiment, right children operators of semi join operators 3, 5, and 6 (308, 312, and 314 respectively) from query plan 300 are merged in the structure 400 of the native access plan 402.

In an embodiment, when the native access plan is generated by code generator 166, each operator may comprise a semi join parent virtual address. The semi join parent virtual address may comprise the virtual addresses of semi join parent operators of which an operator is a right child. Operator 4 404 may have an semi join parent virtual address comprising no virtual addresses, or 0, because it is not the right child operator of any semi join operator and operator 7 410 may have a semi join virtual address comprising the virtual address of semi join operator 5 312, or 5, because it is the right child operator of semi join operator 5 312, which itself is a right child operator of semi join operator 3 308. Further, each semi join operator may comprise a semi join parent virtual address. For semi join operators, the semi join parent virtual address may comprise the virtual address variable of the parent semi join operator of which the semi join operator is a right child. For example, semi join operator 5 312 may have a semi join operator virtual parent address comprising the virtual address of semi join operator 3 308, or 3, and semi join operator 6 314 may have a semi join virtual parent address comprising the virtual address of no semi join operators, or 0, because semi join operator 6 314 is not a right child of any semi join operator.

According to an embodiment, when the native access plan is generated by code generator 166, each semi join operator comprises a deepest right semi join operator variable based upon the position of the semi join operator in the tree of compiled query plan 300. For example, the deepest right semi join operator variable can comprise data indicating whether a semi join operator is the most right child operator of another semi join operator, i.e. a semi join operator is to the right of another semi join operator and is closest to the bottom of the tree. Semi join operator 5 312 may comprise a deepest right semi join operator variable indicating it is the deepest right child of semi join operator 3 308 and semi join operator 3 308 may comprise a deepest right semi join operator variable indicating it is not the right child of any semi join operator.

According to an embodiment, when native access code is generated by code generator 166, each semi join operator comprises a found row variable. The found row variable indicates whether a semi join operator has found a row in a table based upon the functionalities of the operators. For example, semi join operator 3 314 will initially have a found row variable of 0 before execution of the native access plan code. When operator 7 410 is executed, it may search a table for a row based upon the functionality of operator 7 410. If a qualified round is found, then semi join operator 3's 314 found row variable will comprise a found row variable of 1.

Figure 5:
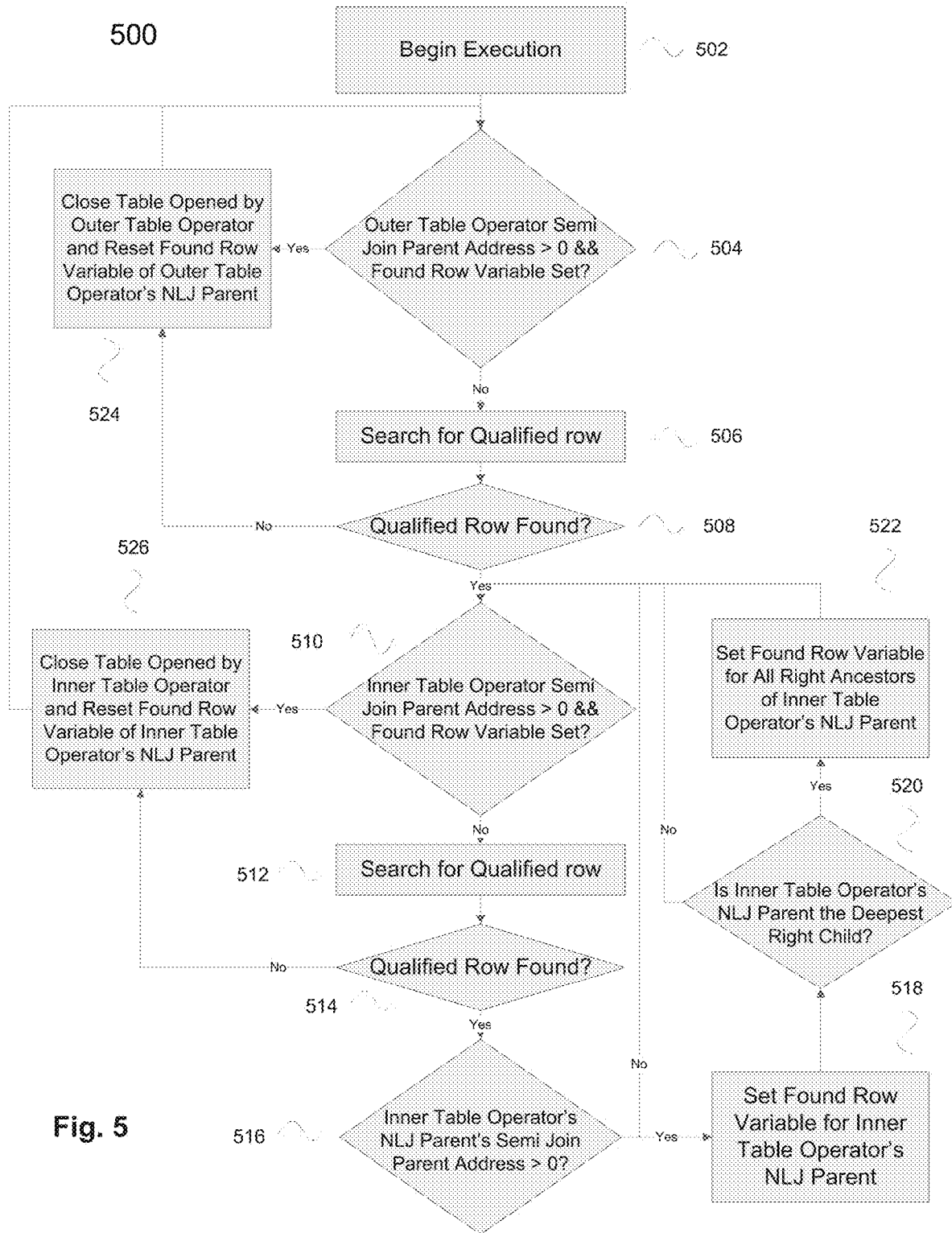
FIG. 5 is a flowchart illustrating a process of closing tables of semi nested loop join operators when native binary code compiled from the native access plan is executed.

FIG. 5 is a flowchart for a method 500 of closing inner tables of a semi NLJ operator when the native binary code complied from the native access plan is executed. Method 500 can be performed by processing logic that can comprise hardware (e.g., circuitry, dedicated logic, programmable logic, microcode, etc.), software (e.g., instructions executing on a processing device), or a combination thereof.

In block 502, execution unit 170 begins to execute the native binary code. In an embodiment, execution unit 170 begins by executing the outer table of a semi NLJ operator in the structure 400 of the native access plan 402. For example, the execution of the native binary code may begin with operator 4 404, which is the outer table operator of semi join operator 3 308.

In block 504, execution unit 170 determines whether the semi join parent virtual address of the outer table operator is greater than 0 and if the NLJ parent of the outer table operator's found row variable indicates a qualified row has been found. If the semi join parent virtual address of the outer table operator is greater than 0 and the NLJ parent of the outer table operator has a found row variable indicating a qualified row has been found, then execution unit 170 will move on to block 524.

In block 524 the execution unit 170 closes any tables opened by the outer table operator. Execution unit 170 will also reset the found row variable of the outer table operator's NLJ parent. For example, if in block 504 operator 4 404 had a semi join parent virtual address greater than 0 and semi join operator 3 308 (operator 4's 404 parent) had a found row variable indicating it had found a qualified row, then the found row variable of semi join operator 3 308 would be reset. Once the found row variable is reset, the execution unit 170 begins to execute another part of the compiled query plan 300.

If, as determined in block 504, the semi join parent virtual address of the outer table operator is not greater than 0 or if the found row variable of the NLJ parent of the outer table operator indicates a qualified row has not been found, then the execution unit 170 will move on to block 506. In block 506, the outer table operator will search for a qualified row in a table according to the functionality of the outer table operator. For example, operator 4 404 would search a table for a row based upon the functionalities of operator 4 404.

In block 508, the execution unit 170 determines whether a qualified row was found by the outer table operator. If a qualified row has been found according to the functionalities of the outer table operator then the execution engine 170 will continue to block 510. Otherwise, if no qualified row has been found according to the functionalities of the outer table operator, then execution engine 170 will move on to block 524.

In block 510, execution unit 170 determines whether the semi join parent virtual address of the inner table operator of the semi NLJ operator is greater than 0 and if the NLJ parent of the inner table operator has found row variable indicating a qualified row has been found. For example, after operator 4 404 finds a qualified row in block 508, the execution engine 170 would determine whether the semi join parent virtual address of semi join operator 5 312, the inner table operator of semi join operator 3 308, is greater than 0 and if semi join operator 3 308 has a found row variable indicating a qualified row has been found. If the semi join operator parent address of the inner table operator is greater than 0 and the parent of the inner table operator has a found row variable indicating a found a qualified row has been found, then execution unit 170 will move on to block 526.

In block 526 the execution unit 170 closes any tables opened by the inner table operator. Execution unit 170 will also reset the found row variable of the inner table operator's NLJ parent. For example, if in block 514 semi join operator 5 312 had a semi join parent virtual address greater than 0 and semi join operator 3 308 (semi join operator 3's 308 parent) had a found row variable indicating it had found a qualified row, then the found row variable of semi join operator 3 308 would be reset. Once the found row variable is reset, block 504 is repeated with the outer table operator of the operator executed at block 526

If, as determined in block 510, the semi join parent virtual address of the inner table operator is not greater than 0 or if the found row variable of the NLJ parent of the inner table operator indicates no qualified row has been found, then the execution unit will move on to block 512. In block 512, the outer table operator will search for a qualified row in a table according to the functionality of the operator In block 514, the execution unit 170 determines whether a qualified row was found by the inner table operator. If a qualified row has been found according to the functionalities of the inner table operator, then the execution engine 170 will continue to block 516. Otherwise, if no qualified row has been found according to the functionalities of the inner table operator, then execution engine 170 will move on to block 526.

In block 516, the execution unit 170 determines if the NLJ parent of the inner table operator has a semi join parent virtual address greater than 0. If the NLJ parent of the inner table operator's semi join parent address is greater than 0 then the execution engine 170 will move on to block 518. Otherwise, if the semi join parent virtual address is not greater than 0, then the execution unit 170 will move on to block 510 using the inner table operator of the operator executed at block 516. For example, if semi join operator 3 308, semi join operator 5's 312 parent, has a semi join parent virtual address greater than 0, then the execution engine 170 will go to block 510 using operator 7 410, the inner table operator of semi join operator 5 312.

In block 518, the found row variable is set for the NLJ parent of the inner table operator. For example, if semi join operator 5 312 had found a qualified row then the found row variable for semi join operator 3 308 (semi join operator 5's 312 parent) would be set to indicate a row was found.

In block 520, the execution unit 170 determines whether the NLJ parent of the inner table operator has deepest right semi join operator variable indicates that the NLJ parent of the inner table operator is the rightmost semi NLJ operator. For example, semi join operator 3's 308 deepest right semi join operator variable may indicate that it is not the rightmost semi join operator. If the NLJ parent of the inner table operator is the rightmost semi join operator in the compiled query plan tree 300, then the execution unit moves on to block 522, otherwise the execution unit goes to block 510 using the inner table operator of the operator executed at block 520.

In block 522, when the execution unit 170 has determined that the NLJ parent of the inner table operator is the rightmost semi join operator, then the found row variable for all the ancestors the NLJ parent of the inner table operator that the NLJ parent of the inner table is a right child of are set to indicate a qualified row has been found. After this is completed, the execution unit 170 goes to block 510 using the inner table operator of the operator executed at block 522.

Figure 6:
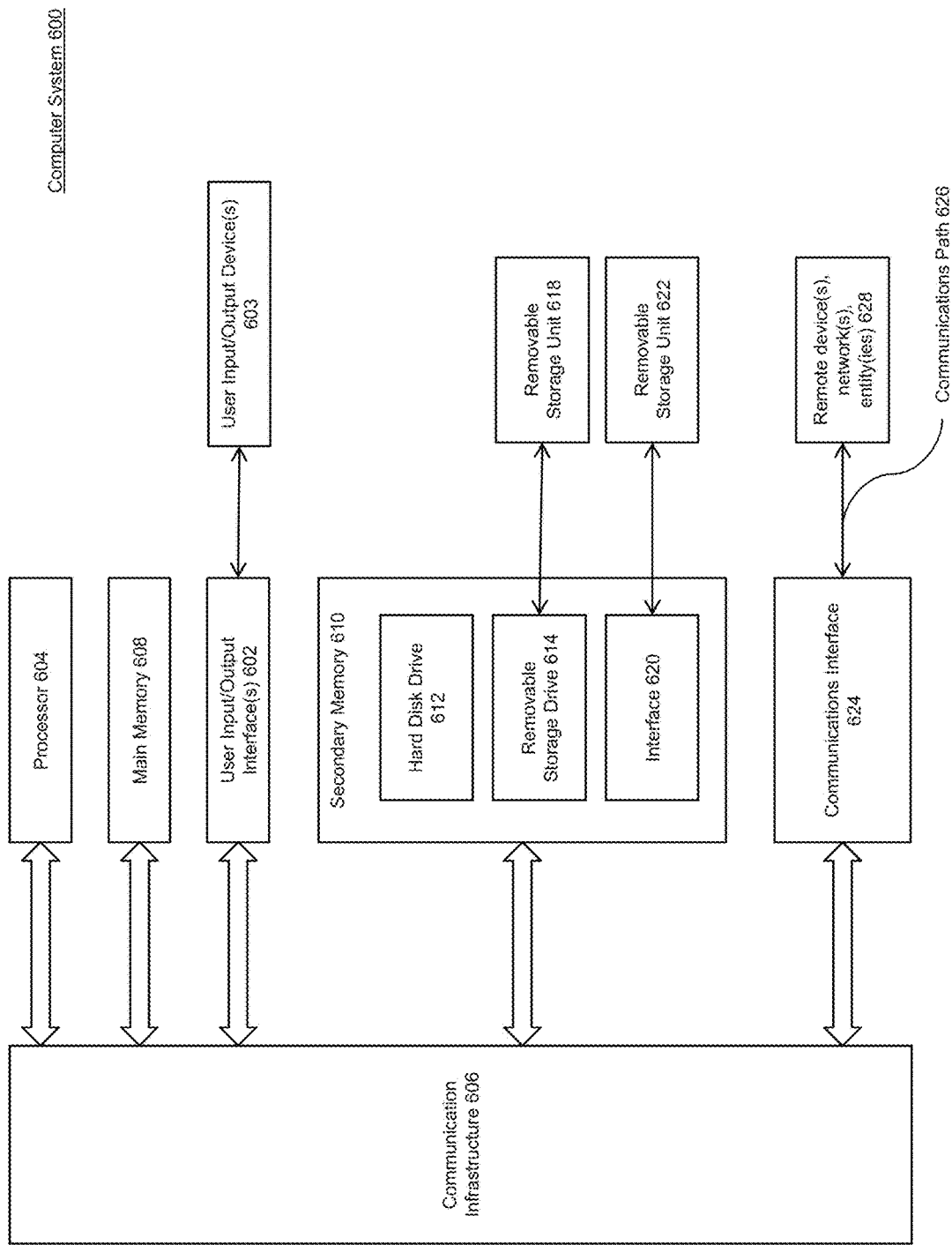
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method comprising:
    generating a plurality of variables based upon positions of a plurality of operators in a query plan, wherein the operators include a plurality of semi-join operations;
    determining a table corresponding to the semi-join operations, including both an inner table and an outer table;
    executing the query plan, wherein executing the query plan includes opening the outer table of at least one of the semi-join operations, wherein data from the opened outer table is stored in memory;
    traversing rows of the table according to the query plan, wherein the traversing identifies one or more qualified rows associated with the table;
    determining whether a virtual address corresponding to a parent for the outer table is greater than zero, wherein the virtual address corresponds to a position of at least one of the semi-join operations within a tree of the query plan; and
    closing the opened outer table based upon a determination that at least one of the rows satisfies a condition of the outer table and the virtual address is greater than zero, wherein the data stored in the memory from the outer table is removed from the memory based upon the closing,
    wherein at least one of the generating, executing, traversing, and closing are performed by one or more computers.

2. The method of claim 1, wherein the query plan comprises a native access plan generated from a received query plan comprising a tree of the plurality of operators.

3. The method of claim 1, wherein the join operation comprises a plurality of semi join operators.

4. The method of claim 1, the traversing comprising:
    setting a flag of an operator based upon traversed rows, wherein the flag comprises data that a qualified row has been traversed.

5. The method of claim 4, further comprising:
    resetting the flag of the operator based on the position of a parent operator of the operator and data of the flag.

6. The method of claim 4, the closing comprising:
    closing a table while the flag of the operator is set.

7. A system, comprising:
    a memory; and
    at least one processor coupled to the memory and configured to:
        generate a plurality of variables based upon positions of a plurality of operators in a query plan, wherein the operators include a plurality of semi-join operations;

determine a table corresponding to the semi-join operations, including both an inner table and an outer table;

execute the query plan, wherein executing the query plan includes opening the outer table of at least one of the semi-join operations, wherein data from the opened outer table is stored in memory;

traverse rows of the table according to the query plan wherein the traversing identifies one or more qualified rows associated with the table;

determine whether a virtual address corresponding to a parent for the outer table is greater than zero, wherein the virtual address corresponds to a position of at least one of the semi-join operations within a tree of the query plan; and close the opened outer table based upon a determination that at least one of the rows satisfies a condition of the outer table and the virtual address is greater than zero, wherein the data stored in the memory from the outer table is removed from the memory based upon the closing.

8. The system of claim 7, wherein the query plan comprises a native access plan generated from a received query plan comprising a tree of the plurality of operators.

9. The system of claim 7; wherein the plurality of variables comprises data indicating positions of the plurality of operators in the query plan and relationships between positions of the plurality of operators in the query plan.

10. The system of claim 7, wherein to traverse rows of tables the at least one processor is configured to:

set a flag of an operator based upon traversed rows, wherein the flag comprises data that a qualified row has been traversed.

11. The system of claim 10; the at least one processor further configured to:

reset the flag of the operator based on the position of a parent operator of the operator and data of the flag.

12. The system of claim 10, wherein to close the at least one processor is configured to:

close a table while the flag of the operator is set.

13. A tangible, non-transitory computer-readable device having instructions stored thereon that, when executed by at least one computing device, causes the at least one computing device to perform operations comprising:

generating a plurality of variables based upon positions of a plurality of operators in a query plan, wherein the operators include a plurality of semi-join operations;

determining a table corresponding to the semi-join operations, including both an inner table and an outer table;

executing the query plan, wherein executing the query plan includes opening the outer table of at least one of the semi-join operations, wherein data from the opened outer table is stored in memory;

traversing rows of the table according to the query plan, wherein the traversing identifies one or more qualified rows associated with the table;

determining whether a virtual address corresponding to a parent for the outer table is greater than zero, wherein the virtual address corresponds to a position of at least one of the semi-join operations within a tree of the query plan; and closing the opened outer table based upon a determination that at least one of the rows satisfies a condition of the outer table and the virtual address is greater than zero, wherein the data stored in the memory from the outer table is removed from the memo based upon the closing.

14. The non-transitory computer-readable device of claim 13, wherein the plurality of variables comprises data indicating positions of the plurality of operators in the query plan and the relationship between positions of the plurality of operators in the query plan.

15. The non-transitory computer-readable device of claim 13, wherein the join operation comprises a plurality of semi join operators.

16. The non-transitory computer-readable device of claim 13, the traversing comprising:

setting a flag of an operator based upon traversed rows, wherein the flag comprises data that a qualified row has been found.

17. The non-transitory computer-readable device of claim 16, the operations further comprising:

resetting the flag of the operator based on the position of a parent operator of the operator and data of the flag.

18. The non-transitory computer-readable device of claim 16, the closing comprising:

closing a table while the flag of the operator is set.

19. The method of claim 4, wherein the virtual address corresponding to the parent of a left side child operator is equal to zero.

20. The method of claim 1, wherein the executing comprises:

selecting the query plan that is from a plurality of query plans, wherein the selected query plan uses a least amount of the memory relative to one or more unselected query plans.

* * * * *